United States Patent
Loy et al.

(10) Patent No.: US 7,777,176 B2
(45) Date of Patent: Aug. 17, 2010

(54) COMPOSITION AND METHOD TO CHARACTERIZE MEMBRANES' DEFECTS

(75) Inventors: Douglas A. Loy, Tucson, AZ (US); Dylan Joseph Boday, Tucson, AZ (US); Jason Wertz, Tucson, AZ (US)

(73) Assignee: Energy Materials Corporation, Livermore, CA (US)

( * ) Notice: Subject to any disclaimer, the term of this patent is extended or adjusted under 35 U.S.C. 154(b) by 0 days.

(21) Appl. No.: 12/228,784

(22) Filed: Aug. 14, 2008

(65) Prior Publication Data
US 2010/0038526 A1    Feb. 18, 2010

(51) Int. Cl.
*G01J 3/51* (2006.01)
*C09K 11/07* (2006.01)

(52) U.S. Cl. .................. 250/226; 252/301.35; 423/338; 423/349

(58) Field of Classification Search .................. 250/226; 252/301.35; 423/338, 349
See application file for complete search history.

(56) References Cited

U.S. PATENT DOCUMENTS

| | | | |
|---|---|---|---|
| 4,636,078 A | | 1/1987 | Povdin |
| 7,011,758 B2 * | | 3/2006 | Rajagopalan et al. ....... 210/650 |
| 7,183,104 B1 * | | 2/2007 | Megerle ................... 435/309.1 |
| 7,217,368 B2 * | | 5/2007 | Lane .......................... 210/787 |
| 7,357,859 B2 * | | 4/2008 | Rajagopalan et al. ......... 210/87 |
| 2003/0091493 A1 | | 5/2003 | Costa et al. |
| 2003/0124564 A1 | | 7/2003 | Trau et al. |
| 2004/0202956 A1 | | 10/2004 | Takahashi et al. |
| 2005/0037201 A1 | | 2/2005 | Hirai et al. |
| 2005/0260676 A1 | | 11/2005 | Chandler et al. |
| 2007/0089489 A1 | | 4/2007 | Lewnard et al. |
| 2008/0029739 A1 | | 2/2008 | Jeganathan et al. |

* cited by examiner

*Primary Examiner*—Seung C Sohn
(74) *Attorney, Agent, or Firm*—Bauman, Dow & León, P.C.; Alberto A. León; Simone M. Seiler (57) ABSTRACT

The chemical composition and method of the invention enable characterization of microscopic defects in membranes such as pinholes, cracks or fissures. The present invention, however, can be used to characterize defects on different types of porous and non-porous membranes used for diverse applications in various industries. It uses brightly fluorescing silica or silsesquioxane spheres prepared with pre-determined definitive and uniform sizes (15 nm-50 microns). The spheres' uniform, controlled size allows them to be used to characterize defects or holes in membranes based on a size exclusion mechanism. The spheres used are engineered to glow brightly when exposed to ultraviolet light in order to allow visual or highly sensitive fluorescence spectroscopy or microscopy to characterize the passage of the particles through defects or holes in a membrane and even identify where the defect is located.

7 Claims, 3 Drawing Sheets

| Sample | Size |
|---|---|
| 1 | 168.9 ± 12.5 nm |
| 2 | 131.1 ± 6.6 nm |
| 3 | 144.9 ± 4.1 nm |
| 4 | 139.4 ± 5.7 nm |
| 5 | 172.9 ± 5.5 nm |
| 6 | 154.4 ± 4.0 nm |
| 7 | 170.8 ± 2.6 nm |
| 8 | 153.4 ± 2.8 nm |
| 9 | 167.7 ± 3.7 nm |

| Sample | Size |
|---|---|
| 1 | 168.9 ± 12.5 nm |
| 2 | 131.1 ± 6.6 nm |
| 3 | 144.9 ± 4.1 nm |
| 4 | 139.4 ± 5.7 nm |
| 5 | 172.9 ± 5.5 nm |
| 6 | 154.4 ± 4.0 nm |
| 7 | 170.8 ± 2.6 nm |
| 8 | 153.4 ± 2.8 nm |
| 9 | 167.7 ± 3.7 nm |

FIG. 1

| Sample | Monomer |
|---|---|
| 2,6 | 1,2-bis(4-(triethoxysilyl)phenyl)ethene |
| 3,7 | 4,4'-bis(4-(triethoxysilyl)styryl)biphenyl |
| 4,8 | 9,10-bis(4-(triethoxysilyl)styryl)anthracene |
| 5,9 | *N,N'*-bis(3-triethoxysilylpropyl)-perylene-3,4:9,10-tetracarboxdiimide |

FIG. 2

| Months | 0 | 6 | 8 |
|--------|---|---|---|
| Size | 228.6 ± 8.8 nm | 237 ± 13.9 nm | 228.7 ± 4.1 nm |

| Vial # | Fluorescent Monomer | MW [g/mol] | Mol % | Amount of monomer [mg] |
|---|---|---|---|---|
| 2 | 2 | 504.76 | 1.00% | 9.05 |
| 3 | 3 | 682.99 | 1.00% | 12.25 |
| 4 | 4 | 707.01 | 1.00% | 12.68 |
| 5 | 5 | 799.02 | 1.00% | 14.33 |
| 6 | 2 | 504.76 | 0.10% | 0.91 |
| 7 | 3 | 682.99 | 0.10% | 1.22 |
| 8 | 4 | 707.01 | 0.10% | 1.27 |
| 9 | 5 | 799.02 | 0.10% | 1.43 |

FIG. 5

COMPOSITION AND METHOD TO CHARACTERIZE MEMBRANES' DEFECTS

CROSS-REFERENCE TO RELATED APPLICATIONS

Non-applicable

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

1. Field of the Invention

The present invention relates generally to the field of microscopic inspection of membranes, and more particularly to compositions and methods to characterize (identify, locate and measure) microscopic defects in membranes.

2. Description of the Related Art Including Information Disclosed Under 37 CFR 1.97 and 37 CFR 1.98

Membranes are generally useful to separate components of a mixture by selectively allowing transit of certain component(s) and not others. Membranes are widely used in commercial and industrial applications such as water purification via filtration or reverse osmosis, food and drug processing, and energy-related applications like battery and fuel cell technology.

Generally, a membrane is used to discriminately allow passage of liquid and filter particulate. In some cases, the membrane's specifications are geared to allow passage of some particulate dissolved in a liquid while blocking passage of other particles. The most common particulate membranes filtered in commercial applications are selected macromolecules, bacterial pathogens, viruses, salts, colloids, and other impurities.

Structurally, membranes are barriers which serve the function of blocking or retaining contaminants and allowing passage of less contaminated, or non-contaminated fluid. Accordingly, and in light of the potentially devastating consequences to large populations which could result from failure of membranes used in large scale water purification applications, it is essential to inspect regularly the blocking properties and thus the integrity of membranes.

The prior art discloses multiple and, in some cases, costly methods of membrane inspection and identification of membrane defects. Bubble point test methodology is used for membrane defect identification in the broadest range of defect sizes. That type of testing is very expensive and time consuming. The basic commercial equipment required for bubble point testing is priced at approximately $10,000 and requires a trained professional to operate, which amounts to approximately $10,000 per test. The existing equipment requires membrane filtration modules to be taken out of service and pressurized to a nominal operating pressure of 600 psi in order to adequately test a filtration system to a 50 nm size range with water as the solvent.

In fact, in an effort to obtain improved approaches for identifying defects in membranes used for water purification, the US Environmental Protection Agency Office of Water has supported development of technology that utilizes nanoparticles made of gold. In the gold-based technology, the gold particles can be detected by use of anodic stripping voltammetry—a method that requires additional costly and complex equipment, and trained technicians. The use of such a complex electrochemical methods is also severely limited in terms of limit of detection (250,000 gold particles particle per mL of liquid). A further limitation of that method for use as a qualitative or quantitative membrane defect characterization tool is the tendency for small gold particles to agglomerate into larger scale particles. In short, implementation of the gold particle process is expected to be very expensive due to the use of a precious metal. That method is further limited by its inability to detect membrane defects in the 15-50 nm range.

In contrast, the method of the present invention utilzes a simple visual detection of fluorescent solutions which require very low (less than parts per billion) detection limits. In fact, the method of this invention can detect a single fluorescent particle. The cost of implementing and using the method of the present invention is relatively low, in part because it does not require using a precious metal or training on complex equipment.

Membranes are also inspected, and their integrity is evaluated using other techniques. Another known way of testing membranes is to apply a pressure differential across the membrane and measure the time decay of the differential. Air, an inert gas or a vacuum can be used to generate the pressure differential. Pressure differential techniques require complex equipment and a considerable investment of time and therefore are very costly. In some cases, the process in which the membrane is being used must be interrupted to perform the evaluation, which adds to the cost and makes the process less efficient. More traditionally, analysis of the filtered fluid provides a qualitative picture of membrane quality.

More recently, Rajagopalan, et al., U.S. Pat. No. 7,011,758 disclosed and claimed a method for testing the integrity of a membrane which comprises placing a magnetically susceptible material in a fluid upstream of the membrane and collecting the material downstream. Rajagopalan's method uses a magnetic field to collect the magnetic material and a sensor to detect it.

The membrane evaluation techniques of the prior art have numerous shortcomings. For the most part, those techniques provide qualitative information only. In other words, and contrary to the method of the present invention, those techniques give an indication that there is a membrane defect, but do not quantify the extent of it. In fact, the prior art does not disclose a single technique which can pinpoint the place on the membrane where a defect may exist or define whether the membrane complies with performance specifications.

BRIEF SUMMARY OF THE INVENTION

The chemical composition of the present invention, which is also known as NANOGLO™, enables rapid and cost-effective characterization (identification and location) of microscopic defects in membranes such as pinholes, cracks or fissures. Applicant developed the method disclosed and claimed herein as part of an effort to identify cost-effective manufacturing and quality-control for their proprietary developmental membranes. The present invention, however, has been found to have wide spectrum applicability on a number of different types of porous and non-porous membranes that are used for diverse applications in various industries. Those membranes include, but are not limited to, membranes made from (1) fluorinated polymers; (2) non-fluorinated, non polar materials; and (3) non-fluorinated, polar materials.

The method of the present invention allows rapid, simple and highly accurate integrity tests to be performed on membranes used in a variety of filtering, purification or manufacturing processes.

The method of the present invention uses brightly fluorescing silica or silsesquioxane spheres prepared with pre-determined definitive and uniform sizes ranging from 15 nanometers (nm) and up to 50 microns (50,000 nm, or the thickness of a human hair). The spheres' uniform controlled size allows them to be used to characterize defects or holes in membranes based on a size exclusion mechanism. The spheres used in the method of this invention are engineered to glow brightly when exposed to ultraviolet light in order to allow visual or highly sensitive fluorescence spectroscopy or microscopy to characterize the passage of the particles through defects or holes in a membrane and even identify where the defect is located (by the residence of fluorescence particles on the membrane).

If NANOGLO™ spheres in a liquid carrier pass through a microscopic defect or hole in a membrane, they will generate a distinct fluorescent glow, which acts as an optical signature in the liquid that passes through the membrane. The intensity of the fluorescence corresponds to the magnitude and/or number of defects. The pre-determined size and color of the spheres provide a quantitative indication of the size of the defect.

For example, the smallest NANOGLO™ spheres of 15 nanometers would identify membrane defects that would allow passage of a retro virus. Larger spheres are capable of identifying defects large enough to allow larger viruses (20-100 nm) or even bacterial pathogens (100 nm-120 microns) to pass through membranes.

DETAILED DESCRIPTION OF THE INVENTION

Figure 1:
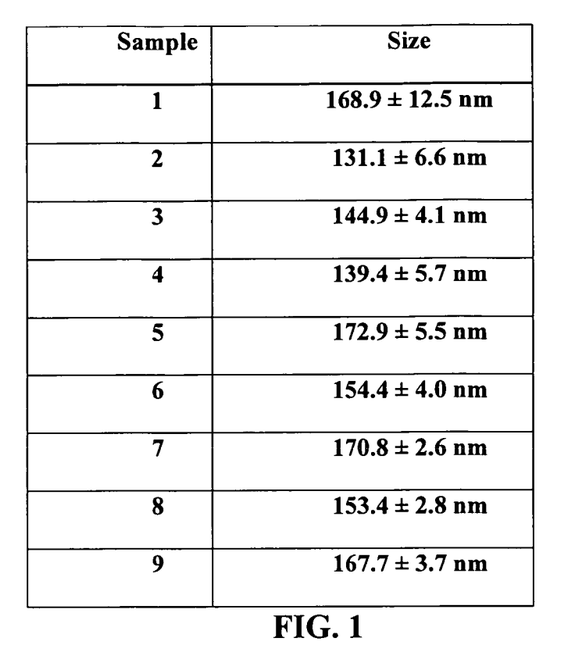
FIG. 1 is a table of dynamic light scattering (DLS) data on the size of particles with standard deviations.

The NANOGLO™ spheres of the present invention comprise a pre-determined fluorescent monomer incorporated into a silica ($SiO_2$) or a silsesquioxane ($RSiO_{1.5}$) nanoparticle by co-polymerizing a silica, silsesquioxane or bridged silsesquioxane monomer with a small (<1%) quantity of a second, highly fluorescent monomer. The majority of each particle is silica, derived from tetraalkoxysilane monomers ($Si(OR')_4$ where R' is a methyl or ethyl group), polysilsesquioxane, derived from monomers ($RSi(OR')_3$ where R is methyl, vinyl, or chloromethyl and R' is a methyl or ethyl group), or bridged polysilsesquioxanes, derived from monomers ($(R'O)_3Si$—R—$Si(OR')_3$ where R is a arylene or alkylene bridging group. The fluorescent monomers used in connection with the NANOGLO™ spheres of this invention are bridged silane monomers with the general chemical structure of ($(R'O)_3Si$—R—$Si(OR')_3$ where the R bridging group is a fluorescent organic group. The fluorescent silica or silsesquioxane particles are prepared from the mixtures of the silica or silsesquioxane monomer and the fluorescent monomer through a modified Stober process. The resulting particle sizes can be confirmed by using dynamic light scattering (DLS). In the preferred embodiment of the invention, the particles are between 15-1000 nanometers in diameter as shown in FIG. 1. Sample 1 in FIG. 1 represents non-fluorescent silica which was synthesized to allow a comparison to silica particles which fluoresce.

After the modified Stober process takes place, all particles are then repeatedly centrifuged resulting in pure fluorescent silica or silsesquioxane nanoparticles. Concentrations of 1.0 mol % (Samples 2-5 in FIG. 1) and 0.1 mol % (Sample 6-9 in FIG. 1) can be used as comparisons.

Figure 2:
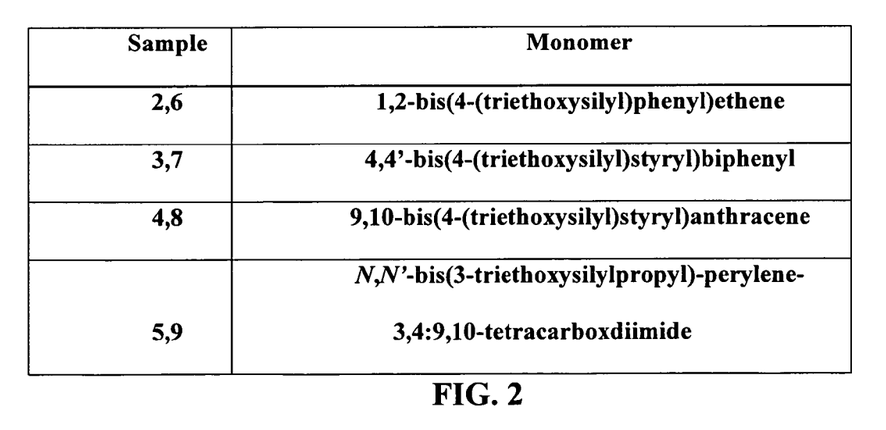
FIG. 2 is a table that shows a correlation between the sample numbers and the specific monomer.

FIG. 2 shows a correlation between the sample numbers and the specific monomer. The chemical structures of the fluorescent monomers that have or could be used, correlated to the sample numbers in FIGS. 1 and 2, are set forth below.

Yellow

5, R' = Me
6, R' = Et

Green

7, R' = Me
8, R' = Et

9, R' = Me
10, R' = Et

11, R' = Me
12, R' = Et

13, R' = Me
14, R' = Et

15, R' = Me
16, R' = Et

17, R' = Me
18, R' = Et

19, R' = Me
20, R' = Et and

21, R' = Me
22, R' = Et.

These monomers can be used in synthetic protocols to yield differently colored particles in a variety of colors (e.g., blue, violet, orange, yellow, green).

Figure 3:
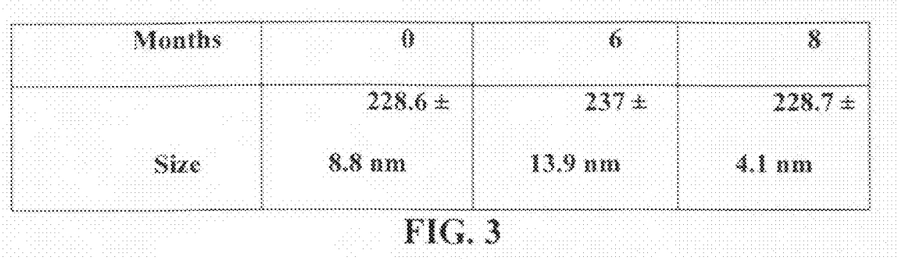
FIG. 3 is a table depicting the results of an aggregation study based on light scattering of particles of 1,2-bis(4-triethoxysilyl)phenyl)ethene monomer over an eight month period.
Figure 4:
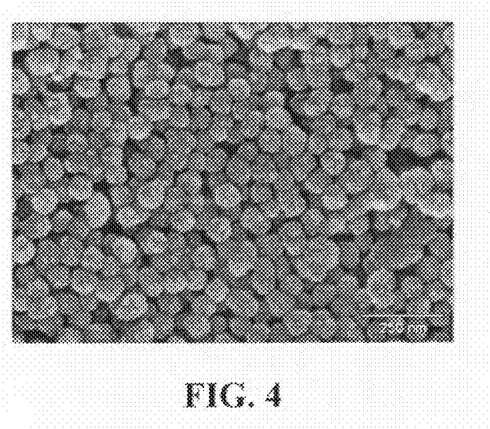
FIG. 4 is a scanning electron microscope (SEM) image of 1.0 mol % 1,2-bis(4-triethoxysilyl)phenyl)ethane fluorescent silica.

In an alternative embodiment of the invention, 250 nm particles, as confirmed using DLS, were synthesized using 1,2-bis(4-triethoxysilyl)phenyl)ethene monomer 2 (1 mol %) and tetraethoxysilane. The aggregation of particles, which is a predictor of shelf life, was determined by examining multiple measurements over an eight-month time period as shown in FIG. 3. In all embodiments of the invention, Scanning Electron Microscopy (SEM) was used to confirm spherical geometry and size for the initially synthesized particles. As a way to illustrate the usefulness of SEM, FIG. 4 shows a SEM image of 1.0 mol % 1,2-bis(4-triethoxysilyl)phenyl) ethane fluorescent silica.

Monomer synthesis, as set forth above, produced very distinct fluorescent violet, blue, yellow, green and orange dyes that were bonded within the silica or silsesquioxane matrix. The monomers used do not have to be 100% pure, but purity can be increased via recrystallization.

Interestingly, changing the concentration of fuorescent monomer does not appear to affect the fluorescent intensity of the particles significantly. In contrast, adding monomer 8, results in a change in color of the particles from dark red to red as the concentration of fluorescent monomer decreases. That change is due to the reduction of the eximer emission which is taking place, which results from the decrease in concentration. Monomers 3 and 4 exhibit the greatest intensity and there is little visible change in intensity resulting from changes in the concentration of fluorescent monomer.

NANOGLO™ spheres in the lowest size range (15 nm) can be introduced into a membrane filtration system to test for defects that could allow harmful microbes to pass through. If passage is detected then additional spheres of progressively larger size are introduced to the membrane filtration system in order to define the upper limits of the defect or fissure size. Importantly, the NANOGLO™ spheres have been engineered, using more hydrophobic silsesquioxanes rather than silica, to have "non-sticking" characteristics, so that spheres will not stick to the surface of membranes and promote fouling or blockage of the defect, which enables determination of the magnitude of the defect.

The differently sized spheres of the present invention can be manufactured in multiple distinct colors (e.g., blue, violet, orange, yellow, green) using the different fluorescent dyes, which allows for a faster and simpler test protocol. For example, multiple simultaneous tests can take place using the different sized particles each with a different color (color coded spheres of different sizes), where a particular color corresponds to a particular size. Such method allows much simpler, visual testing, location and characterization of membrane defects.

Another variation of the method of the present invention utilizes food and drug-safe fluorescent dyes of particular color which (in addition to the inert materials of the spheres, themselves) enhances the utility of the method in food and drug processing applications. The silica nano particle "encapsulation" of such colored fluorescent additives eliminates the need for subsequent sterilization and cleaning equipment following characterization of defects in a membrane being used as part of a particular food or drug processing protocol.

Monomer Synthesis 4,4'-Bis(4-(triethoxysilyl)styryl)biphenyl (4). To a three neck 25 mL round bottom, (triethoxysilyl)styrene (1.006 g, 3.8 mmol) was added. To this solution, a magnetic stir bar and 4,4'-dibromophenyl (1.176 g, 3.8 mmol) were added, followed by anhydrous toluene (10 ml). To this solution, tri-o-tolylphosphine (0.085 g, $2.6 \times 10^{-5}$ mol) along with palladium acetate (0.015 g, $4.45 \times 10^{-5}$ mol) were added. To the solution, triethylamine (1.35 g, 1.33 mmol) was added. This solution was stirred and heated at 105° C. After an hour, an additional amount of (triethoxysilyl)styrene (0.9006 g, 3.4 mmol) was added along with additional anhydrous toluene (10 mL). The solution was allowed to react for 24 hours. The brown solution was vacuumed suctioned through CELITE® to remove palladium. The solution was removed in vacuo yielding compound 4, a yellow solid.

9,10-Bis(4-(triethoxysilyl)styryl)anthracene (6). To a three neck 25 mL round bottom, (triethoxysilyl)styrene (1.508 g, 5.6 mmol) was added. To this solution, a magnetic stir bar aND 9,10-dibromoanthracene (0.946 g, 2.8 mmol) were added followed by anhydrous toluene (10 mL). To this solution, tri-o-tolylphosphine (0.082 g, $2.6 \times 10^{-5}$ mol) and palladium acetate (0.016 g, $4.45 \times 10^{-5}$ mol) were added. To the solution, triethylamine (1.35 g, 1.33 mmol) was added. This solution was stirred and heated at 105° C. After an hour, additional anhydrous toluene (18 mL) was added. The solution was allowed to react for 24 hours. The brown solution was vacuumed suctioned through CELITE® to remove palladium. The solvent was removed in vacuo yielding compound 6, an orange solid.

N,N'-Bis(3-triethoxysilylpropyl)-perylene-3,4:9,10-tetracarboxdiimide (8). A 0.786 g (2.00 mmol) sample of 3,4,9,10-perylene-tetracarboxylic dianhydride was added to a 250 mL three neck round bottom, followed by 70 mL of dry ethanol. The round bottom was repeatedly evacuated and flushed with argon. After the mixture stirred for 30 minutes under argon, it was heated in an oil bath to 105° C. A 4.43 g (0.020 mol) sample of 3-aminopropyltriethoxysilane (APTES) was added dropwise through a septum. The red reaction mixture was stirred for 24 hours under reflux and under an inert atmosphere. After the mixture was cooled to room temperature, the red precipitate was collected by suction filtration and washed thoroughly with cold ethanol. The red solid was dried in a vacuum oven to yield compound 8 (0.955 g, 59%).

N,N'-Bis(3-triethoxysilylpropyl)-naphthalene-1,4:5,8-tetracarboxdiimide (10). A 0.536 g (0.002 mol) sample of 1,4,5,8-naphthalene-tetracarboxylic dianhydride was added to a 250 mL three neck round bottom, followed by 100 mL of dry ethanol. The round bottom was repeatedly evacuated and flushed with argon. After the mixture stirred for 30 minutes under argon, it was heated in an oil bath to 105° C. A 4.43 g (0.020 mol) sample of 3-aminopropyltriethoxysilane (APTES) was added dropwise through a septum to the opaque brown solution changing it to a transparent brown solution. The reaction mixture was stirred for 72 hours under reflux and under an inert atmosphere. After the mixture was cooled to room temperature, the brown solution was roto-vaped and dried in vacuo yielding compound 10.

4,4'-Dibromostilbene. To a three neck 50 ml round bottom, 4-bromostyrene (14.490 g, 0.0786 mol) was added. To the solution, a magnetic stir bar along with dichloromethane (DCM) (10 mL) were added. To the solution, Grubb's catalyst (0.500 mg, $5.8 \times 10^{-4}$ mol) along with DCM (25 mL) was added. The solution was allowed to react for 24 hours at room temperature. The precipitate was filtered and placed into a vial for storage.

Nanoparticles Synthesis

Fluorescent nanoparticles are prepared by co-polymerizing a fluorescent monomer (<1 mol %) with a dilutent monomer (>99 mol %) under Stober conditions (monomer, excess water, ammonium hydroxide in ethanol) to afford monodisperse particles whose size can be controlled by varying the concentration of ammonium hydroxide, among other variables. Silica nanoparticles are prepared by the copolymerization of a silica precursor such as tetramethoxysilane or tetraethoxysilane with the fluorescent monomer. More hydrophobic nanoparticles can be prepared by copolymerizing silsesquioxane monomers, MeSi(OR')$_3$ (R'=methyl or ethyl) or (R'O)$_3$SiRSi(OR')$_3$ (R'=methyl or ethyl, R=phenylene, methylene, ethylene, ethenylene, hexylene, octylene, or octafluorooctylene).

Fluorescent violet silica (150 nm in diameter). To a 20 mL scintillation vial, ethanol (7 mL) and ammonium hydroxide (1 mL) were added followed by a magnetic stir bar. The solution was vigorously stirred for 30 minutes at room temperature. To a separate 20 mL scintillation vial, fluorescent monomer 2 along with ethanol (8 mL) were added [FIG. 5]. A magnetic stir bar was then added to the vial and vigorously stirred at room temperature. After 5 minutes, tetraethyl orthosilicate (TEOS; 0.4 mL, 1.79 mmol) was added and the solution was stirred for 30 minutes under the same conditions. After 30 minutes, the stir bar was removed from the first vial and the solution was poured quickly into the second vial and capped. The solution was allowed to stir for at least 24 hours at room temperature. After 24 hours, a diluted sample of silica was tested using DLS. The colloidal silica solution was centrifuged at 4000 rpm for 1 hour and the supernatant was checked for residual fluorescent monomer using long wave ultraviolet light.

Figure 5:
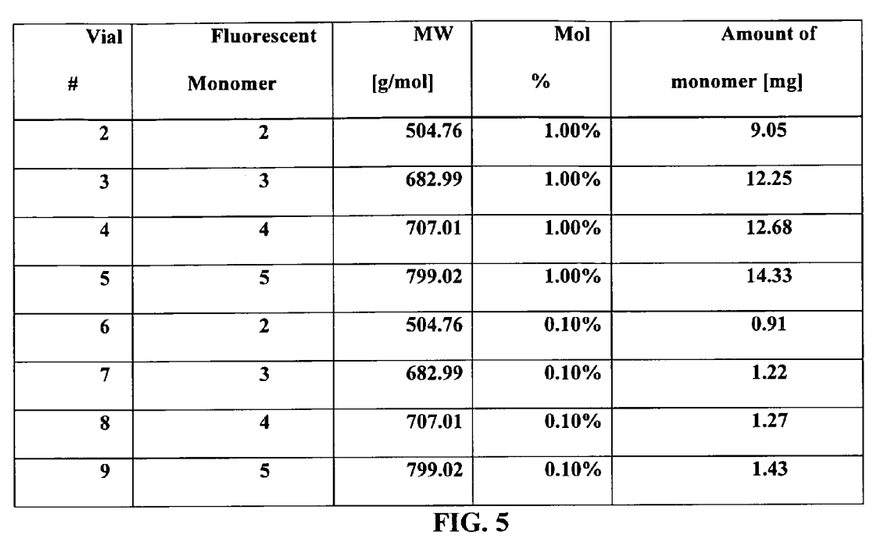
FIG. 5 is a table that shows the absorption-emission spectra for solutions of the monomers and their silica nanoparticles.

Fluorescent violet silica (250 nm in diameter). To a 20 mL scintillation vial, ethanol (2.3 mL), 2 M ammonia (3.75 ml), and 18.3 MΩ water (0.16 mL) were added followed by a magnetic stir bar. The solution was vigorously stirred for 30 minutes at room temperature. To a separate 20 mL scintillation vial, 1,2-bis(4-triethoxysilyl)phenyl)ethene monomer 2 along with ethanol (2.3 mL) were added. A magnetic stir bar was then added to the vial and vigorously stirred at room temperature. After 5 minutes, tetraethyl orthosilicate (TEOS; 0.38 mL, 1.70 mmol) was added and the solution was stirred for 30 minutes under the same conditions. After 30 minutes, the stir bar was removed from the first vial and the solution was poured quickly into the second vial and capped. The solution was allowed to stir for at least 24 hours at room temperature. After 24 hours, a diluted sample of silica was tested using DLS. The colloidal silica solution was centrifuged at 4000 rpm for 1 hour and the supernatant was checked for residual fluorescent monomer using long wave ultraviolet light. Absorption-emission spectra for solutions of the monomers and their silica nanoparticles are shown in FIG. 5.

What is claimed is:

1. A spherical, brightly fluorescing, non-sticking chemical composition of predetermined, definitive and uniform size ranging from 15 nanometers and up to 50 microns, engineered to glow brightly when exposed to ultraviolet light, capable of characterizing microscopic defects in membranes, the chemical composition comprising:
    a. nanoparticle selected from the group consisting of silica and silesquioxame, the nanoparticle being prepared by the sol-gel polymerization of tetramethoxysilane and tetraethoxysilane for silica nanoparticles; and the two starting materials selected from the group consisting of methytrimethoxysilane and methyltriethoxysilane; 1,4-bis(triethoxysilyl)benzene and 1,4-bis(trimethoxysilyl) benzene; 1,1-bis(triethoxysilyl)methane and 1,1-bis(trimethoxysilyl)methane; 1,2-bis(triethoxysilyl)ethane and 1,2-bis(trimethoxysilyl)ethane; 1,2-bis(triethoxysilyl)ethene, and 1,2-bis(trimethoxysilyl)ethene; 1,6-bis(triethoxysilyl)hexane and 1,6-bis(trimethoxysilyl)hexane; 1,8-bis(triethoxysilyl)octane and 1,8-bis(trimethoxysilyl)octane; and 1,8-bis(triethoxysilyl)3,3,4,4,5,5,6,6-octafluorooctane and 1,8-bis(trimethoxysilyl)3,3,4,4,5,5,6,6-octafluorooctane for silsesquioxane nanoparticles; and
    b. a fluorescent, bridged silane momomer with the general chemical structure of (R'O)$_3$Si—R—Si(OR')$_3$, where R' is methyl or ethyl, capable of being incorporated into the nanoparticle via a modified Stober process.

2. The spherical, brightly fluorescing chemical composition of claim 1, wherein the size and color of the chemical composition is determined by the monomer used, the monomer being selected from the group consisting of the following chemical structures:

Violet

1, R' = Me
2, R' = Et

Blue

3, R' = Me
4, R' = Et

Yellow

5, R' = Me
6, R' = Et

-continued

Green

7, R' = Me
8, R' = Et

9, R' = Me
10, R' = Et

11, R' = Me
12, R' = Et

13, R' = Me
14, R' = Et

-continued

15, R' = Me
16, R' = Et

17, R' = Me
18, R' = Et

19, R' = Me
20, R' = Et

21, R' = Me
22, R' = Et

3. A method of synthesizing the spherical, brightly fluorescing chemical composition of claim 1 in pure state, the method comprising the steps of:
 a. incorporating a silane monomer into a silica matrix through a modified Stober process, the modified Stober process comprising the steps of mixing the monomer with excess water and ammonium hydroxide in ethanol, resulting into nanoparticles of a pre-determined size;
 b. confirming the size of the resulting nanoparticles using dynamic light scattering; and
 c. centrifuging the resulting nanoparticles to remove excess monomer.

4. A method to characterize microscopic defects in membranes using the spherical, pure fluorescent chemical composition of claim 1, the method comprising the steps of:
 a. introducing the chemical composition of claim 1 into a membrane filtration system;

b. detecting passage of the nanoparticles through the membrane using a detection method selected from the group consisting of visual inspection, fluorescence spectroscopy and microscopy; and c. if passage is detected, then introducing chemical compositions of progressively larger sized into the membrane filtration system in order to define the upper limits of the defect's size.

5. The method of claim 4 wherein the spherical, brightly fluorescing chemical composition comprises a mixture of chemical compositions which had been pre-manufactured in multiple, distinct colors using a different fluorescent dye for each size, color-coded chemical compositions of different sizes, the colors selected from the group consisting of violet, blue, yellow and green, and where a particular color corresponds to a particular size chemical composition, thus allowing multiple membrane characterization protocols to be run simultaneously.

6. The method of claim 5 wherein the fluorescent dye comprises food and drug-safe fluorescent dyecolor additives resulting in a colored chemical composition, wherein the specific color of the chemical composition is a function of the dye color additive used.

7. The method of claim 4 wherein the membrane is made from a material selected from the group including fluorinated polymers, non-fluorinated, non-polar materials; and non-fluorinated, polar materials.

* * * * *